(12) United States Patent
Pritchett

(10) Patent No.: US 9,098,339 B2
(45) Date of Patent: Aug. 4, 2015

(54) PREDICTIVE CLOUD-BASED PRESIMULATION

(75) Inventor: Joel Pritchett, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 489 days.

(21) Appl. No.: 13/494,806

(22) Filed: Jun. 12, 2012

(65) Prior Publication Data

US 2013/0332510 A1 Dec. 12, 2013

(51) Int. Cl.
*G06F 15/16* (2006.01)
*G06F 9/50* (2006.01)
*H04L 29/08* (2006.01)
*H04L 29/06* (2006.01)
*G06F 17/30* (2006.01)

(52) U.S. Cl.
CPC .......... *G06F 9/5044* (2013.01); *G06F 9/5072* (2013.01); *A63F 2300/407* (2013.01); *G06F 17/30902* (2013.01); *G06F 2209/509* (2013.01); *H04L 67/10* (2013.01); *H04L 67/38* (2013.01)

(58) Field of Classification Search
CPC .............. G06F 9/5044; G06F 9/5072; G06F 17/30902; H04L 67/38; H04L 67/10; H04L 67/2847; A63F 2300/407; A63F 2300/6615
USPC ............................................................ 703/6
See application file for complete search history.

(56) References Cited

U.S. PATENT DOCUMENTS

| | | | | |
|---|---|---|---|---|
| 5,907,696 A | * | 5/1999 | Stilwell et al. | 703/13 |
| 5,956,039 A | * | 9/1999 | Woods et al. | 345/419 |
| 6,341,262 B1 | * | 1/2002 | Damani et al. | 703/16 |
| 6,767,287 B1 | * | 7/2004 | Mcquaid et al. | 463/42 |
| 7,062,567 B2 | * | 6/2006 | Benitez et al. | 709/231 |
| 7,376,693 B2 | * | 5/2008 | Neiman et al. | 709/201 |
| 8,082,133 B2 | * | 12/2011 | Watte | 703/6 |
| 8,289,327 B1 | * | 10/2012 | Horvath | 345/428 |
| 8,429,630 B2 | * | 4/2013 | Nickolov et al. | 717/148 |
| 8,438,298 B2 | * | 5/2013 | Arai et al. | 709/231 |
| 8,564,595 B1 | * | 10/2013 | Ho et al. | 345/426 |
| 8,612,196 B2 | * | 12/2013 | Rosedale et al. | 703/13 |
| 2003/0220984 A1 | * | 11/2003 | Jones et al. | 709/219 |

(Continued)

OTHER PUBLICATIONS

Kamimura et al, "A Speed-up Technique for an Auto-Memoization Processor by Reusing Partial Results of Instruction Regions", Proc. 3rd Int'l Conf. on Networking and Computing, pp. 49-57, Jan. 30-Feb. 2, 2012.*

(Continued)

*Primary Examiner* — Mary C Jacob
(74) *Attorney, Agent, or Firm* — Aaron Chatterjee; Kate Drakos; Micky Minhas

(57) ABSTRACT

Embodiments related to predictive cloud-based presimulation are described herein. For example, one disclose embodiment provides, on a computing device, a method comprising receiving an input of state from a client device and executing a server simulation of a digital experience based on the input of state, the server simulation configured to run concurrently with, and ahead of, a client simulation on the client device. The method further comprises generating a plurality of simulation results from the server simulation, selecting one or more simulation results from the plurality of simulation results based on a likelihood the client simulation will utilize a particular simulation result, and sending the one or more simulation results to the client device.

19 Claims, 5 Drawing Sheets

(56) References Cited

U.S. PATENT DOCUMENTS

| | | | |
|---|---|---|---|
| 2009/0049421 A1* | 2/2009 | Meijer et al. | 717/100 |
| 2009/0300144 A1* | 12/2009 | Marr et al. | 709/219 |
| 2010/0229108 A1 | 9/2010 | Gerson et al. | |
| 2010/0257228 A1 | 10/2010 | Staggs et al. | |
| 2010/0306082 A1* | 12/2010 | Wolper et al. | 705/27 |

OTHER PUBLICATIONS

Mateos et al, "Enhancing the BYG Gridification Tool with State-of-the-Art Grid Scheduling Mechanisms and Explicit Tuning Support", Advances in Engineering Software, 43, pp. 27-43, available online Sep. 25, 2011.*

Capps, Michael, "Fidelity Optimization in Distributed Virtual Environments", Naval Postgraduate School, Jun. 2000.*

Garney et al, "Video Game Optimization", Course Technology PTR, 2011.*

"CFD in the Azure Cloud", Retrieved at <<http://www.symscape.com/blog/cfd-azure-cloud>>, Oct. 13, 2010, pp. 3.

Guo, et al., "Dynamic Volumetric Cloud Rendering for Games on Multi-Core Platforms", Retrieved at <<http://software.intel.com/en-us/articles/dynamic-volumetric-cloud-rendering-for-games-on-multi-core-platforms/>>, May 9, 2010, pp. 9.

Zohar, et al., "The Power of Prediction: Cloud Bandwidth and Cost Reduction", Retrieved at <<http://conferences.sigcomm.org/sigcomm/2011/papers/sigcomm/p86.pdf>>, Proceedings of SIGCOMM, Aug. 15, 2011, pp. 86-97.

Stone, Mary, "Evidence points to energy savings in cloud computing", Retrieved at <<http://www.rbj.net/print_article.asp?aID=189110>>, Retrieved Date: Feb. 7, 2012, pp. 3.

Stackpole, Beth, "Autodesk Cloud Makes Its Official Debut", Retrieved at <<http://www.designnews.com/document.asp?doc_id=234006>>, Retrieved Date: Feb. 7, 2012, pp. 8.

* cited by examiner

PREDICTIVE CLOUD-BASED PRESIMULATION

BACKGROUND

Cloud-based services allow network-connected devices to leverage capabilities that may not be available on the devices due, for example, to cost, size, and/or power consumption considerations. Such services may be used, for example, in a video game environment to leverage the greater computing resources of a cloud-based game server. However, in some situations, the user experience may be impacted by network performance. As such, users may experience noticeable lag or degradation in simulation quality.

SUMMARY

Embodiments related to predictive cloud-based presimulation are disclosed herein. For example, one disclose embodiment provides, on a computing device, a method comprising receiving an input of state from a client device and executing a server simulation of a digital experience based on the input of state, the server simulation configured to run concurrently with, and ahead of, a client simulation on the client device. The method further comprises generating a plurality of simulation results from the server simulation, selecting one or more simulation results from the plurality of simulation results based on a likelihood the client simulation will utilize each of the one or more simulation results, and sending the one or more simulation results to the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
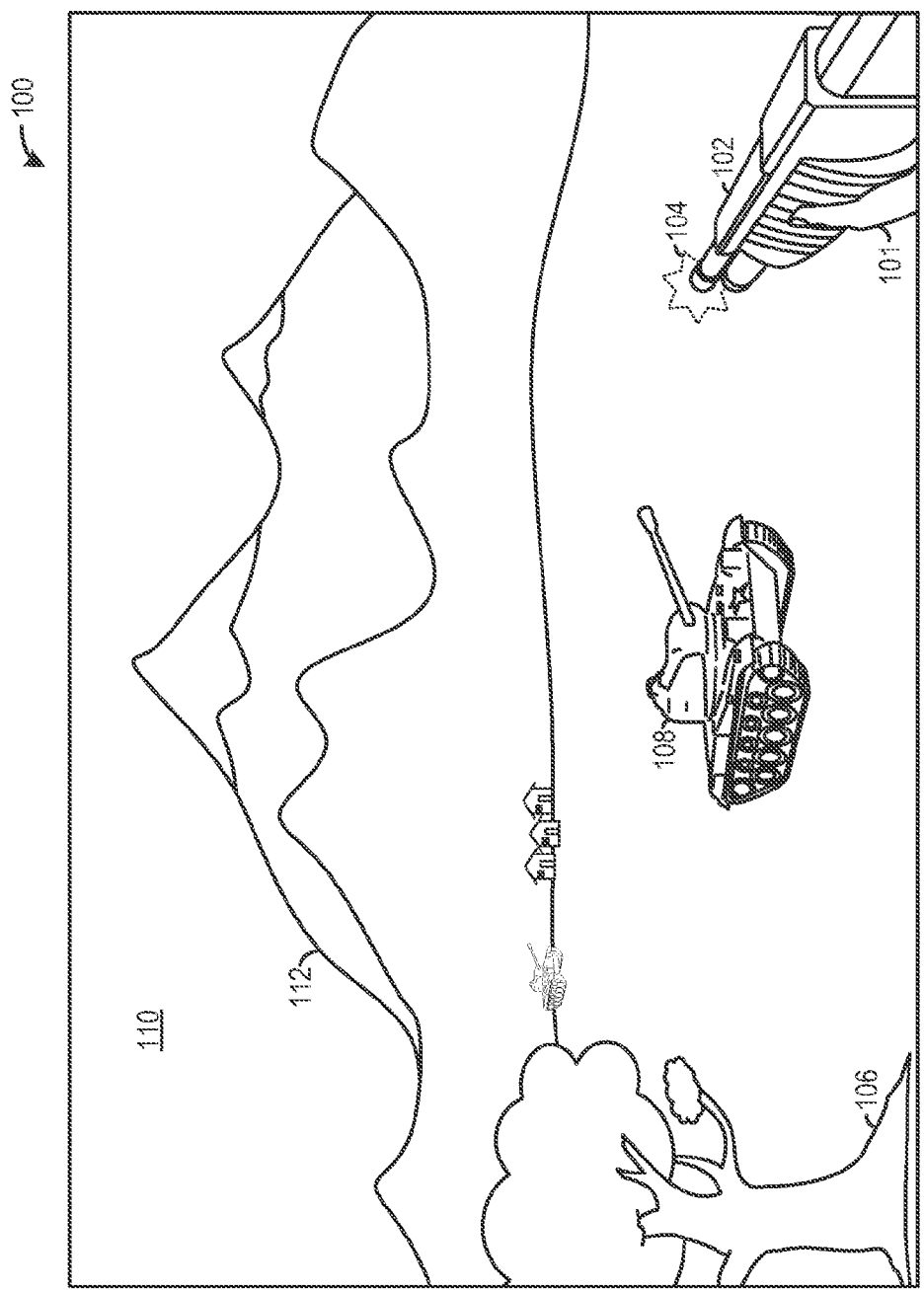
FIG. 1 shows an embodiment of an example digital experience utilizing predictive cloud-based presimulation.

As network connectivity has become commonly available for computing devices ranging from smart phones and tablet computers to gaming consoles and set-top boxes, cloud-based services have likewise become increasingly available. Cloud-based services may allow network-connected devices executing a digital experience to offload all or part of a computing task to the service, thereby leveraging potentially greater computing resources of the cloud-based service. The term "digital experience" as used herein refers to any user experience produced by execution of computer-readable instructions. Examples of digital experiences include, but are not limited to, video games and other interactive media experiences (e.g. interactive television), as well as non-game and/or non-media experiences (e.g. productivity applications such as word processors, presentation editing and/or playback programs, etc.). It will be understood that these embodiments of digital experiences are presented for the purpose of example, and are not intended to be limiting in any manner.

In some scenarios, an entire digital experience may be executed by a cloud-based service, and a rendered digital experience (e.g., audio, video, etc.) is transmitted to the client device for presentation. Such a configuration may reduce the performance requirements of the client device. However, latency arising from the network connection between the device and the server may be noticeable when responding to user inputs, which may offset any performance benefits offered by the resources of the cloud-based service.

In other scenarios, execution of the digital experience may be distributed across both the client device and the cloud-based service, such that the client handles some portions of the digital experience, and the server handles other portions. However, the implementation of such distributed execution of a digital experience may involve making decisions during development as to which portions of the experience are to be offloaded to the server system. Such an approach may be time-consuming, and may result in an inflexible system in light of potential fluctuations in network and/or hardware performance. Further, such an approach may not be readily useable with existing digital experiences.

Thus, embodiments are disclosed herein that relate to intelligently and adaptively distributing tasks between a client and a cloud-based service. While participating in a digital experience, a user may be capable of influencing a small portion of the overall digital experience (e.g., immediate area near a virtual character) at any given time. The disclosed embodiments may automatically identify via a predictive mechanism those portions of a digital experience that are not likely to be readily influenced by user actions, and provide those portions of the digital experience via the cloud-based service for presentation by the client. Portions that are likely to be influenced by user actions may be executed locally on the client.

The portions of the digital experience to be provided by the cloud-based service and transmitted to the client may be identified in any suitable manner. In some embodiments, as described in more detail below, a cloud-based presimulation may be executed concurrently with, and ahead of, a client-based simulation. Results from the cloud-based presimulation may be selectively sent to the client for use by the client simulation based upon a likelihood that a presimulation result will be utilized by the client. As used herein, the term "presimulation" refers to a simulation on the server system configured to execute concurrently with, and ahead of, a client simulation executing on the client device. Such a predictive mechanism may provide for efficient and adaptable distribution of a simulation between a client and a cloud-based service, and may be applied to existing digital experiences which utilize deterministic simulations (i.e. simulations in which a same outcome is produced by a same input, even if performed at a different time).

FIG. 1 shows an embodiment of a digital experience 100 in which predictive cloud-based presimulation may be utilized. A first-person combat video game scenario is presented for the purpose of example, but it will be understood predictive cloud-based presimulation may be used with any other suitable digital experience. Digital experience 100 is displayed on a computing device display (e.g. a television, monitor, mobile device screen, head-mounted display, and/or any other suitable display device), and comprises primary elements 101, 102 and 104, illustrated as virtual character, a weapon and a muzzle flash, respectively, wherein the term "primary" indicates elements that are directly controlled via user input. For example, the movement of the virtual character 101 and the weapon 102 may substantially mirror motion of a game controller or user body part gesture, and the muzzle flash (element 104) may be displayed upon user-actuation of a "fire" button. As elements 101, 102 and 104 are affected by user inputs and players may expect immediate feedback to user inputs, elements 101, 102 and 104 may be examples of portions of digital experience 100 that may be desirable to render locally on a client device to avoid network latency.

Digital experience 100 further comprises elements 106 and 108, illustrated as a tree and an enemy tank, respectively, that may be affected by manipulation of the primary elements, but are not as likely as the primary elements to be affected. For example, the tree (106) or the tank (108) may be configured to explode upon impact of a projectile fired from the weapon (102). Such elements may be referred to herein for convenience as "secondary elements."

Digital experience 100 further comprises elements 110 and 112, illustrated as sky and mountains, respectively, that are far away from the virtual character (101) and/or otherwise unlikely to be affected by manipulation of the primary elements. Such elements may be referred to herein for convenience as "tertiary elements." Secondary elements 106 and 108 and tertiary elements 110 and 112 may be examples of elements well suited for cloud-based presimulation, as discussed in more detail below.

During progression of digital experience 100, the likelihood of user interactions affecting a selected element of digital experience 100 may vary during use. For example, in the illustrated example, as the virtual character 101 moves towards element 106, bullets fired by the player may be more likely to strike element 106 and cause display of a bullet hit. As such, the portions of the digital experience that are executed on the cloud-based service and sent to the client may vary during the course of the digital experience as the likelihood of user actions affecting the portion changes, as discussed in more detail below.

Figure 2:
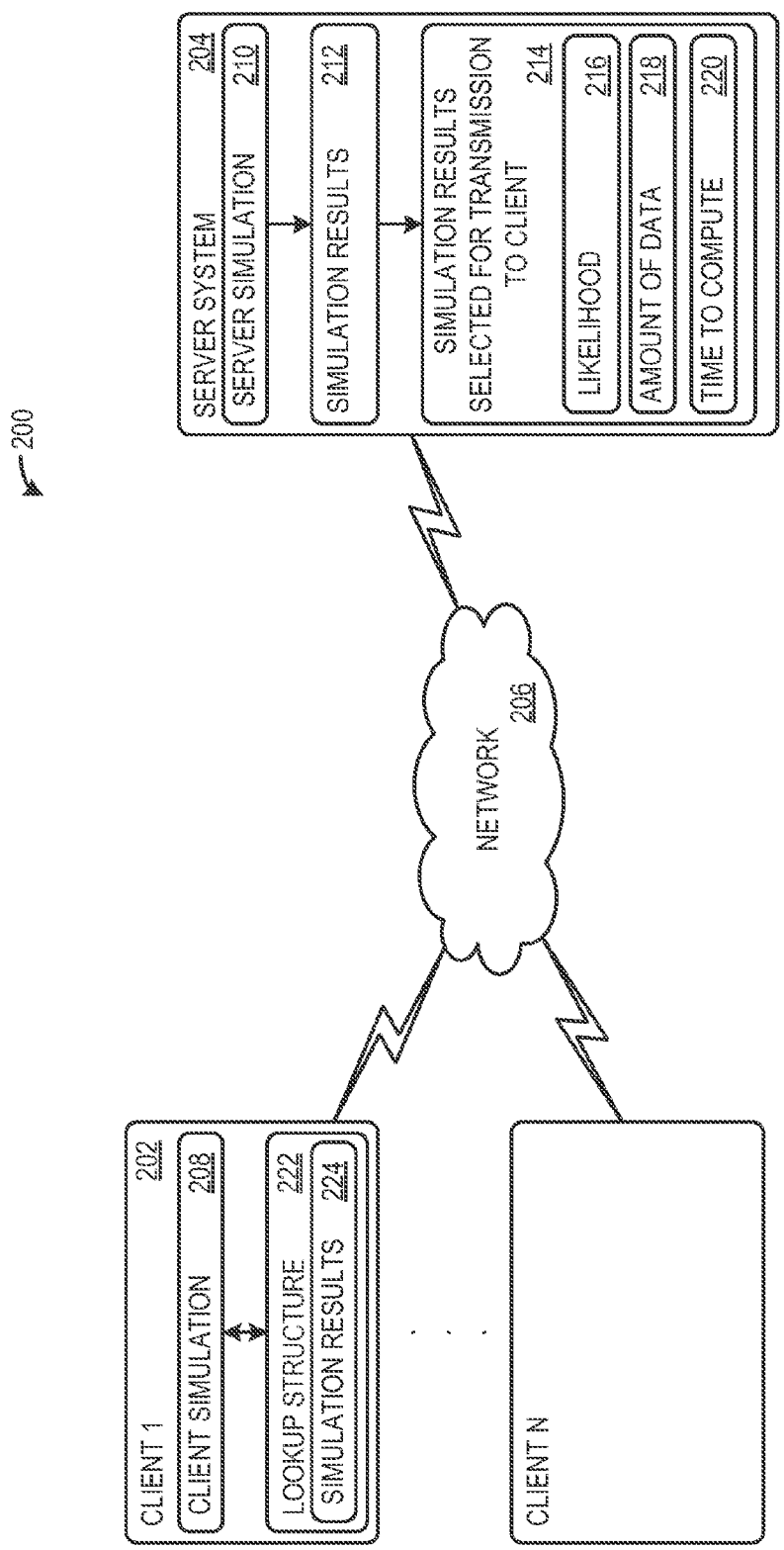
FIG. 2 shows an embodiment of an example use environment for providing predictive cloud-based presimulation of a digital experience.

FIG. 2 shows an embodiment of an example use environment 200 for providing predictive cloud-based presimulation of a digital experience. Environment 200 comprises one or more client devices 202, illustrated as an arbitrary number N of client devices. Environment 200 further comprises server system 204 in communication with client devices 202 via computer network 206 (e.g., the Internet). It will be understood that network 206 may comprise any suitable combination of networks and/or subnetworks without departing from the scope of the present disclosure.

Client device 202 may be configured to execute a simulation 208 of a digital experience (e.g., digital experience 100). In some embodiments (e.g., thin client scenarios), client device 202 may be configured to locally execute a lower-quality digital experience (e.g., lower frame rate, lower resolution, compressed audio, etc.).

In order to provide a higher quality digital experience, server system 204 may be configured to operate a cloud-based service configured to execute a server simulation 210 concurrently with, and ahead of, client simulation 208, such that server system 204 presimulates the digital experience. Presimulation may allow server system 204 to predict information likely to be used by client device 202, and to therefore provide said information to client device 202 ahead of the use of the information by client device 202. This may help to utilize comparatively greater computing resources of server system 204 for the benefit of client device 202 while avoiding network latency.

As a more specific example, during presentation of the digital experience by a client device, when a function call occurs, the client device may first check for high-quality pre-simulation results from server simulation 210 corresponding to the particular called function and set of inputs for the called function. If results corresponding to that function call and set of inputs have been previously received from the cloud-based service, then the client device may use the higher-quality server simulation results without executing the function call locally.

On the other hand, if results corresponding to that function call and set of inputs have not been previously received from the cloud-based service (e.g. where the cloud-based service elected not to send those particular results or the results failed to reach the client), then the client may execute the function call to produce lower-quality simulation results. In this manner, the lower-quality simulation on the client device may provide a "fallback" option in rendering the digital experience. It will be noted that the portions of the digital experience that are affected by user actions (e.g. muzzle flash 104 of FIG. 1) may be relatively small portions of the overall experience. Thus, a substantial portion of the overall user experience may be produced by the higher-quality simulation provided by the cloud-based service, while the lower-quality portions may have a relatively small presence in the overall experience. It further will be understood that these scenarios are presented for the purpose of example, and that client simulation 208 and server simulation 210 may comprise any suitable configuration without departing from the scope of the present disclosure. For example, in other embodiments, simulations 208 and 210 may be executed at similar quality.

To help to ensure that results from the server simulation 210 are relevant to the client simulation 208, client device 202 may be configured, upon receipt of user input, to provide information regarding said input to server simulation 210. Server simulation 210 may thus be configured to "rewind" to the state (e.g., frame) associated with the input and to re-initialize the simulation based on the state. It will be understood that the state of a digital experience may be represented by a relatively small amount of data. For example, in some embodiments, client device 202 may be configured to provide an input of state comprising the state of a user input device used to control the digital experience (e.g. a video game controller). In such embodiments, the state may be represented by, for example, eight bytes or less. Where such a digital experience is provided at 30 frames per second, the state provided to the cloud-based service from the client may utilize a maximum of 240 bytes per second to represent the user input, thereby utilizing a small amount of upstream bandwidth.

Due to server simulation 210 executing ahead of client simulation 208, not all server simulation results 212 may ultimately be used by client simulation 208. For example, user inputs received at the client may alter the course of the client simulation relative to the server simulation. As such, and in light of the overhead associated with generating results 212 and transmitting said results to client device 202, it may be desirable not to send all of the server simulation results to client device 202.

Accordingly, as mentioned above, server system 204 may be further configured to apply one or more metrics to server simulation results 212 in order to select simulation results 214 to send to client device 202. For example, server system 204 may be configured to determine a likelihood 216 that client simulation 208 will utilize a particular server simulation result 212, and may determine whether to send a particular server simulation result based upon the determined likelihood.

Likelihood 216 may be determined in any suitable manner. For example, likelihood 216 may be determined via statistics regarding the outcome of re-simulation of previous simulation results. As described above, upon receipt of an input of state from client device 202, server system 204 may be configured to re-initialize server simulation 210 to reflect said input of state. Resimulation may result in one or more previously-produced simulation results 212 being invalidated. Such statistics may therefore comprise data regarding how often the re-simulation produces a same or different result as a previous simulation.

Server system 204 may be further configured to select one or more simulation results 214 based on an amount of data 218 in the function output of the particular simulation result 212 and/or an amount of time 220 used by server simulation 210 to generate the particular simulation result 212. For example, it may be inefficient to send results 212 to client device 202 that use relatively little time to compute and/or are represented by a relatively large amount of data, as such results may be efficiently simulated on client device 202, and may utilize an undesirable amount of bandwidth if sent from server system 204. Likewise, results 212 that utilize a greater amount of time to compute, yet are represented by a relatively small amount of data, may be well-suited for simulation on the cloud-based service, as such results would benefit from the greater computing resources of server system 204 yet utilize relatively little bandwidth.

Server system 204 may provide the selected simulation results 214 to client device 202 for storage in a lookup structure 222. At any given time, lookup structure 222 may therefore comprise one or more simulation results 224 received from server system 204.

During execution of client simulation 208, client device 202 may be configured to interact with lookup structure 222 in order to determine (e.g. upon occurrence of a function call) if lookup structure 222 includes a particular result 224. If the lookup structure includes the particular result 224 (e.g. a result corresponding to a particular function and set of inputs for the function), the result may be utilized by client simulation 208 in lieu of computing the result locally on client device 202. It will be appreciated that retrieving a result from the lookup structure 222 may increase performance of client simulation 208 versus determining the result locally.

On the other hand, as mentioned above, if lookup structure 222 does not include a particular result 224, client device 202 may be configured to compute the result locally. Such a scenario may occur, for example, if server system 204 determines (e.g., based on likelihood 216, amount of data 218, and/or amount of time 220) that the result is not suitable to send to client device 202, or if results sent by the server are not received due, for example, to network problems.

The results sent from server system 204 may take any suitable form and be stored in any suitable data structure or structures. For example, as one non-limiting example, the server results may be "memoized." Memoization is a term that signifies storing, and subsequently utilizing, a previously computed result in lieu of re-computing the result. In order to determine if a given result has been previously computed for given input(s), memoization techniques may comprise computing a hash value from the input(s) and storing said hash value with the computed result in a memoization table. As a hash value may be represented by a lesser amount of data than the input from which it was computed, it may be desirable to transmit the hash value in lieu of the input in order to preserve network 206 bandwidth. Accordingly, in some embodiments, a hash value may be computed by server system 204 and transmitted to client device 202 for inclusion in lookup structure 222. Similarly, the server 204 may be configured to transmit a hash value representing the computed result or one or more elements thereof, or any other suitable representation of results. It will be appreciated that other memoization techniques may employ other methods of representing inputs than the computation of hash values.

Such a memoization scheme may be implemented by utilizing marked function calls that memoize inputs and results in the simulations. Further, existing programs may be adapted for such a scheme simply by replacing function calls marked function calls to implement memoization. For example, a function call of the form:
    Entity.Update(dt)
may be replaced with a "marked" function call of the form
    CloudMemoize(CEntity::Update, Entity, dt).

When a marked function is called on the client, the memoization table is referenced to determine if the memoization table includes a previously-computed return value for the input. Likewise, when a marked function is called on the cloud-based server simulation, the amount of data 218 in the return value and the execution time of the function 220 may be recorded for use in computing a return value cost metric for use in determining whether or not to send the results to the client.

Additional information may be obtained via a memoization function call by noting the identification of the object ("mId") on which the function is being executed, as follows.
    CloudMemoize(Entity->mId, CEntity::Update, Entity, dt).
The function and mId may be used to create a unique computation identifier. This may allow the memoizer to differentiate results based on the object on which the function is being executed. As each input is received from the client and the digital experience is resimulated, the cloud-based service may create a record of how predictable function calls on particular objects are by tracking how often resimulation produces the same result, as described above.

The predictablility metric may then be combined with the return value cost metric to create an overall score for the objects result. When a particular frame is then at some distance ahead of the local simulation, the memoization result table on the cloud-based service may be sorted by the score computed to identify results to be sent to the client. It will be noted that such a system may be configured to stop sending data to the client when a per frame bandwidth allowance is reached. This may allow the system to utilize the entire connection when available while also being able to limit bandwidth use to preserve resources other data (e.g. voice) where appropriate.

It will be understood that the same marked code may be executed on both the client and the cloud-based service. In such embodiments, the code may determine whether it is being executed on the server or client, and then determine the score values if it is running on the cloud-based service. Likewise, code on the client may run in a mode such that it reads from the memoization table but does not write to the memoization table when executing marked function calls.

It will be understood that any other suitable factors may be used in determining which simulation results to send to the client device. For example, in some embodiments, code may be used to mark various objects as unpredictable, such as objects located close to parts of the game that are directly affected by the player. This may help to avoid sending results to the client for such objects, as such objects may change in response to user actions. Marking objects as unpredictable may help to handle situations such as where a player who has been inactive for longer than the presimulation window suddenly takes an action that invalidates several frames of data that have been sent from the server.

Figure 3:
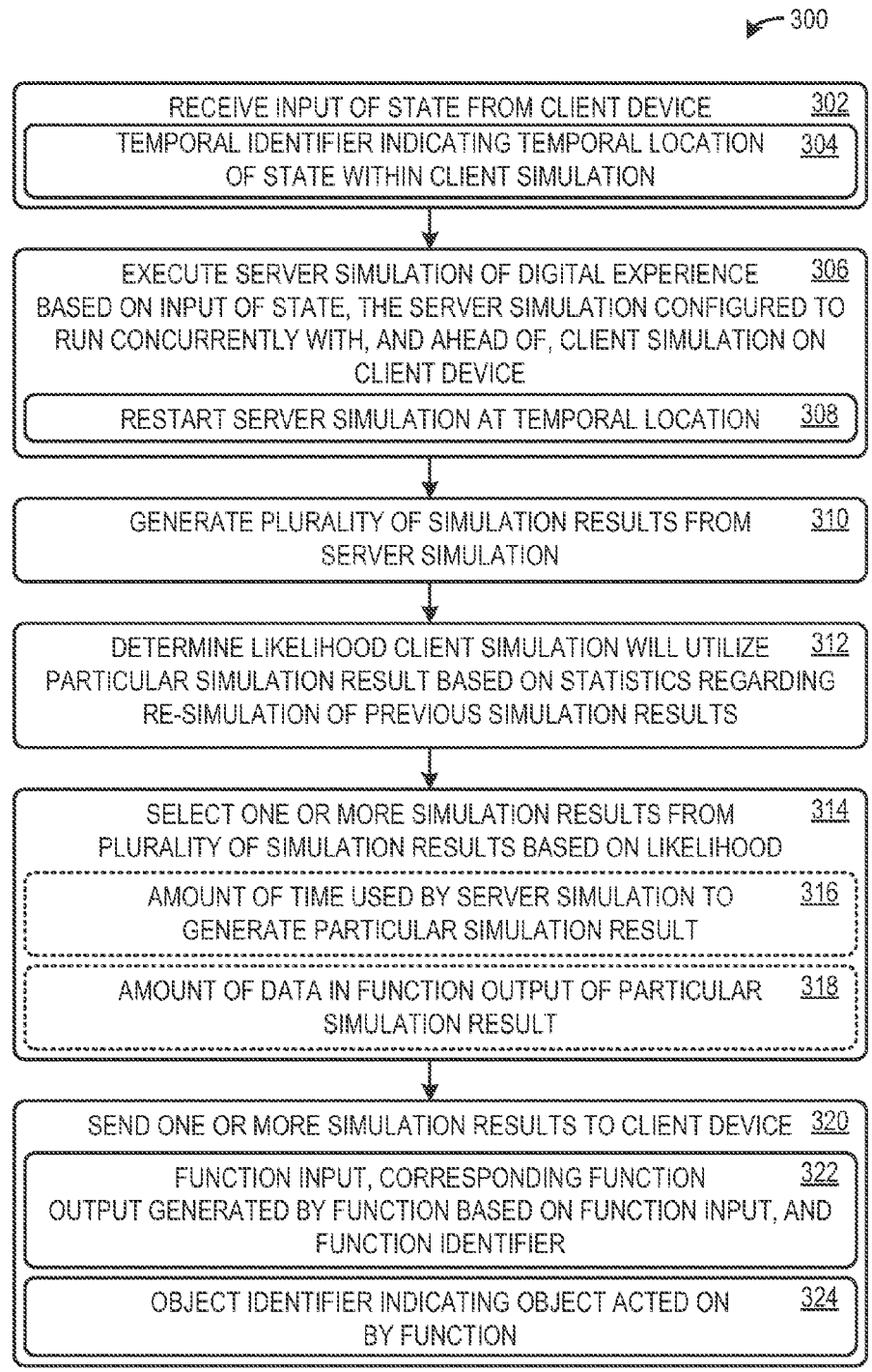
FIG. 3 shows a process flow depicting an embodiment of a method for providing predictive cloud-based presimulation.

FIG. 3 shows a process flow depicting an embodiment of a method 300 for providing predictive cloud-based presimulation. Method 300 comprises, at 302, receiving an input of state from a client device executing a client simulation. As mentioned above, an input of state may be received from the client device in response to a user input received by the client device, or upon any other suitable triggering event.

The input of state received at 304 may comprise a temporal identifier 304 indicating a temporal location of the state within the client simulation (e.g., client simulation 208). For example, in some embodiments, temporal identifier 304 may comprise a frame number. It will be appreciated that temporal indicator 304 may comprise any suitable information configured to associate the input of state with a location in the client simulation.

At 306, method 300 comprises executing a server simulation of a digital experience based on the input of state, the server simulation configured to run concurrently with, and ahead of, the client simulation on the client device. Executing the server simulation may comprise, at 308, reinitializing the server simulation at the temporal location. In other words, the server simulation may "rewind" to the temporal location and restart the simulation using the input of state at that location, thus helping to ensure that server simulation results are relevant to the client simulation. The server simulation may then re-simulate a predetermined amount into the future, for example, by executing at an accelerated rate versus the client simulation. The server simulation may be configured to run at any suitable amount of time ahead of the client simulation. Examples include, but are not limited to, times of up to two seconds. A more specific non-limiting example of a range of times comprises times between 500 milliseconds and one second. Such times may be suitable in light of the latencies common with 3G cellular phones as well as game consoles. It will be appreciated that simulating farther ahead of the client may help to ensure that the client receives the results in time to use them, but also increases a risk that the results may no longer be relevant and therefore may be re-simulated.

At 310, method 300 comprises generating a plurality of simulation results from the server simulation. At 312, method 300 comprises, for each result, determining a likelihood that the client simulation will use the result. This likelihood may be determined in any suitable manner, such as via statistics regarding the outcome of re-simulating previous simulation results. It will be understood that such re-simulation results may be tracked based upon information such as an identification of a function that produces the results, inputs to the function, an object acted upon by the function, and/or any other suitable information.

Method 300 further comprises, at 314, selecting one or more simulation results (e.g., simulation results 214) from the plurality of simulation results based on a likelihood the client simulation will utilize a particular simulation result. In some embodiments, the one or more simulation results may be further selected based on other information, such as an amount of time 316 used by the server simulation to generate the particular simulation result, and/or an amount of data 318 in the particular simulation result. It will be appreciated that these embodiments are presented for the purpose of example, and that the one or more simulation results may be selected according to any other suitable manner without departing from the scope of the present disclosure.

As described above, the use of an object identifier may provide function-and-object-level granularity in analyzing the simulation results to determine the one or more results to provide to the client. For example, referring to the example digital experience 100 of FIG. 1, a function may be configured to calculate damage/injury to various elements of experience 100. Executing such a function may use more resources when acting on element 108 (tank) than on the element 106 (tree). As such, it may be determined to execute the function locally at the client device when acting on the tree, but via the remote service when acting on the tank.

At 320, method 300 comprises sending the one or more simulation results to the client device. Each of the one or more simulation results may comprise any suitable information. For example, each result may comprise, at 322, a representation of each of a function input, a corresponding function output generated by a function based on the function input and a function identifier, wherein the representation may take any suitable form. For example, as discussed above in reference to FIG. 2, a hash value may be computed by the server system representing the simulation results or one or more elements thereof. It will be appreciated that other representations are possible without departing from the scope of the present disclosure. In some embodiments, at 324, each of the one or more simulation results may further comprise an object identifier indicating an object (e.g., tank element 108 of digital experience 100) acted on by the function. The use of a function identifier may allow the likelihood of a simulation result being used to be determined on a more granular level than where an object identifier is not utilized. Further, in some embodiments, each of the one or more simulation results may comprise a frame number to which that simulation result is linked. It will be understood that said information is intended to be non-limiting, and that simulation results may comprise additional and/or different information.

Figure 4:
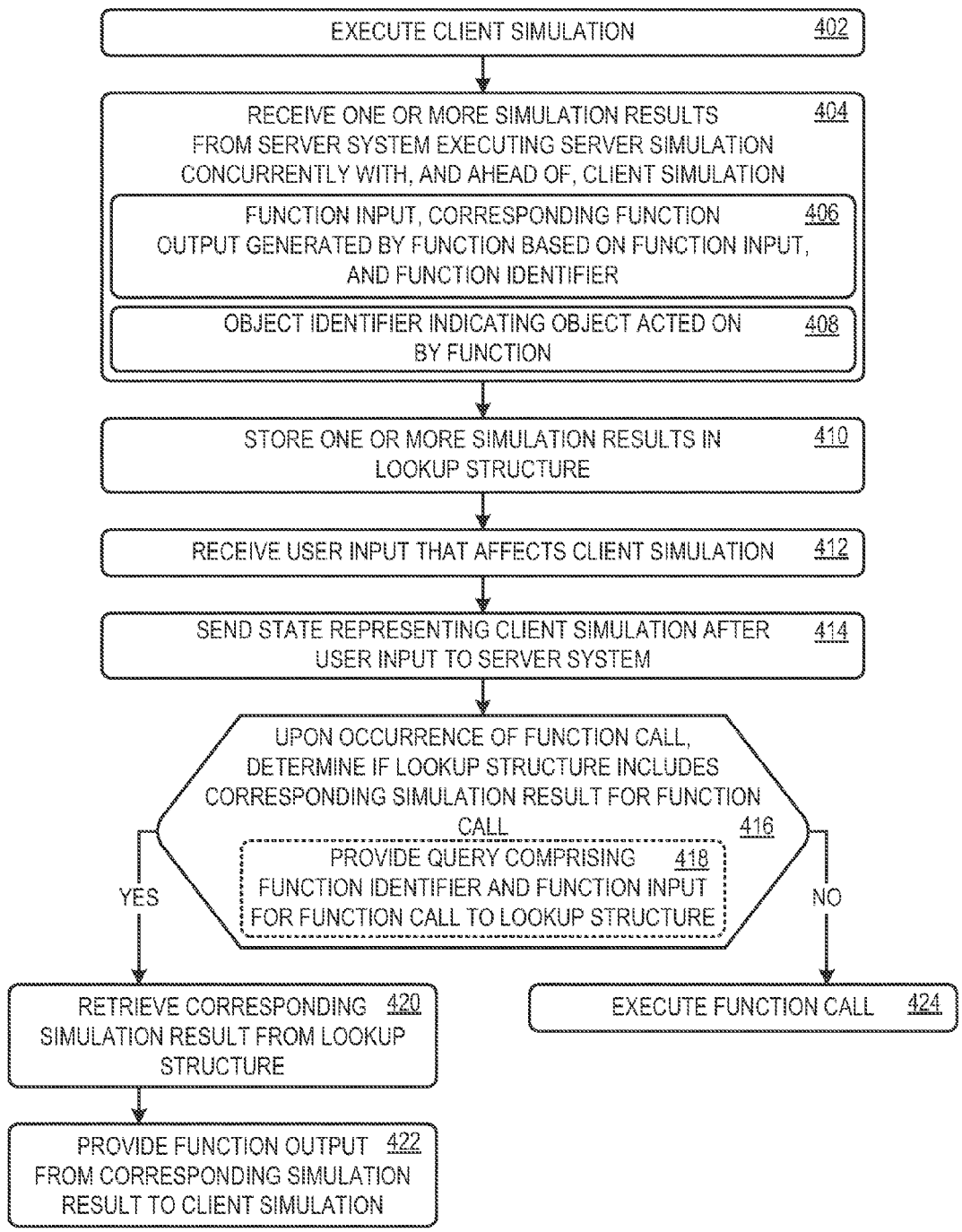
FIG. 4 shows a process flow depicting an embodiment of a method for executing a client simulation of a digital experience utilizing predictive cloud-based presimulation.

FIG. 4 shows a process flow depicting an embodiment of a method 400 for executing a client simulation of a digital experience utilizing predictive cloud-based presimulation. Method 400 comprises, at 402, executing the client simulation. At 404, method 400 comprises receiving one or more simulation results from a server system executing a server simulation (e.g., server simulation 210) concurrently with, and ahead of, the client simulation. The simulation results may comprise any suitable information. For example, as indicated at 406, in some embodiments each of the simulation results may comprise a representation of each of a function input, a corresponding function output generated by a function based on the function input, and a function identifier. Further, as indicated at 408, in some embodiments each simulation result may further comprise an object identifier indicating an object acted on by the function.

At 410, method 400 comprises storing the one or more simulation results in a lookup structure (e.g., lookup structure 222). Next, at 412, method 400 comprises receiving a user input that affects the client simulation. At 414, method 400 comprises sending a state representing the client simulation after the user input to the server system. As mentioned above, said state may be utilized to reinitialize the server simulation. It will be understood that such user inputs may be received continually during execution of the digital experience.

At 416, method 400 comprises, upon occurrence of a function call, determining a corresponding simulation result for the function call is stored in the lookup structure. For example, the client simulation may comprise marked function calls configured to produce interaction with the lookup structure. In some embodiments, determining if the lookup structure includes a corresponding simulation result may comprise, at 418, providing a query comprising the function identifier and the function input for the function call. It will be understood that these scenarios are presented for the purpose of example, and that determining if the lookup structure includes a corresponding simulation result may be accomplished via any suitable mechanism or combination of mechanisms.

If the lookup structure includes the corresponding simulation result, method 400 retrieving the corresponding simulation result from the lookup structure at 420. Method 400 further comprises, at 422, providing a function output from the corresponding simulation result to the client simulation. In other words, if the lookup structure includes a corresponding simulation result, method 400 comprises utilizing the result without re-computing the result. On the other hand, it is determined at 416 that the lookup structure does not include a corresponding simulation result, method 400 comprises executing the function call at 424.

The simulations results received by the client device may be stored for any suitable length of time. For example, where the simulation results are linked to a specific frame of the digital experience, the simulation results may be expunged after passage of that frame. In other embodiments, the simulation results may be expunged at any other suitable time.

In some embodiments, the above described methods and processes may be tied to a computing system including one or more computers. In particular, the methods and processes described herein may be implemented as a computer application, computer service, computer API, computer library, and/or other computer program product.

Figure 5:
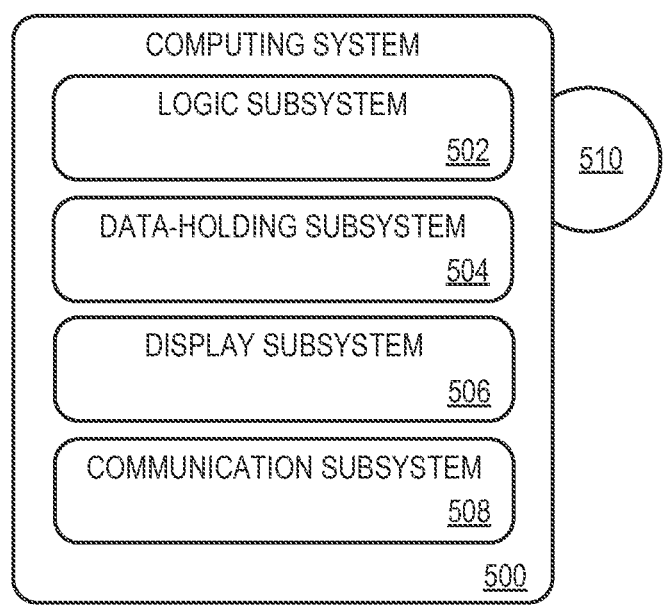
FIG. 5 schematically shows an example embodiment of a computing system.

FIG. 5 schematically shows a nonlimiting computing system 500 that may perform one or more of the above described methods and processes. Client device 202 and server system 204 of FIG. 2 are non-limiting examples of computing system 500. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc.

Computing system 500 includes logic subsystem 502 and data-holding subsystem 504. Computing system 500 may optionally include display subsystem 506, communication subsystem 508, and/or other components not shown in FIG. 5. Computing system 500 may also optionally include user input devices such as keyboards, mice, game controllers, cameras, microphones, and/or touch screens, for example.

Logic subsystem 502 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 504 may include one or more physical, non-transitory, devices configured to hold data and/or instructions executable by the logic subsystem to implement the herein described methods and processes. When such methods and processes are implemented, the state of data-holding subsystem 504 may be transformed (e.g., to hold different data).

Data-holding subsystem 504 may include removable media and/or built-in devices. Data-holding subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 504 may include devices with one or more of the following characteristics: volatile, nonvolatile, dynamic, static, read/write, read-only, random access, sequential access, location addressable, file addressable, and content addressable. In some embodiments, logic subsystem 502 and data-holding subsystem 504 may be integrated into one or more common devices, such as an application specific integrated circuit or a system on a chip.

FIG. 5 also shows an aspect of the data-holding subsystem in the form of removable computer-readable storage media 510, which may be used to store and/or transfer data and/or instructions executable to implement the herein described methods and processes. Removable computer-readable storage media 510 may take the form of CDs, DVDs, HD-DVDs, Blu-Ray Discs, EEPROMs, and/or floppy disks, among others.

It is to be appreciated that data-holding subsystem 504 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 500 that is implemented to perform one or more particular functions. In some cases, such a module, program, or engine may be instantiated via logic subsystem 502 executing instructions held by data-holding subsystem 504. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 506 may be used to present a visual representation of data held by data-holding subsystem 504. As the herein described methods and processes change the data held by the data-holding subsystem, and thus transform the state of the data-holding subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or data-holding subsystem 504 in a shared enclosure, or such display devices may be peripheral display devices.

When included, communication subsystem 508 may be configured to communicatively couple computing system 500 with one or more other computing devices. Communication subsystem 508 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method comprising:
   receiving an input of state from a client device;
   executing a server simulation of a digital experience based on the input of state, the server simulation configured to run concurrently with, and ahead of, a client simulation of the digital experience being executed on the client device;
   generating a plurality of simulation results from the server simulation;
   determining, for each simulation result, a likelihood that the client simulation will utilize the simulation result;
   selecting one or more simulation results from the plurality of simulation results based on the likelihood, for each selected simulation result, that the client simulation will utilize the selected simulation result; and
   sending the one or more selected simulation results to the client device.

2. The method of claim 1, wherein selecting the one or more simulation results is further based on an amount of time used by the server simulation to generate each of the one or more selected simulation results.

3. The method of claim 1, wherein selecting the one or more simulation results is further based on an amount of data in a function output of each of the one or more selected simulation results.

4. The method of claim 1, wherein each of the one or more selected simulation results sent to the client device comprises a representation of each of a function input, a corresponding function output generated by a function based on the function input, and a function identifier.

5. The method of claim 4, wherein each of the one or more selected simulation results sent to the client device further comprises an object identifier indicating an object acted on by the function.

6. The method of claim 1, wherein the input of state comprises a temporal identifier indicating a temporal location of the state within the client simulation.

7. The method of claim 6, wherein the temporal location comprises a frame number.

8. The method of claim 7, wherein executing the simulation comprises reinitializing the server simulation at the temporal location.

9. The method of claim 1, further comprising determining the likelihood based on one or more statistics regarding re-simulation of previous simulation results.

10. The method of claim 1, wherein the server simulation is configured to be executed at a higher quality than the client simulation on the client device.

11. On a computing device, a method of executing a client simulation of a digital experience, the method comprising:
    receiving one or more simulation results from a server system executing a server simulation of the digital experience concurrently with, and ahead of, the client simulation being executed at the computing device, each of the simulation results comprising a function input, a corresponding function output generated by a function based on the function input, and a function identifier;
    storing the one or more simulation results in a lookup structure;
    upon occurrence of a function call, determining if the lookup structure includes a corresponding simulation result for the function call;
    if the lookup structure includes the corresponding simulation result, retrieving the corresponding simulation result from the lookup structure and executing the client simulation using the corresponding simulation result retrieved from the lookup structure; and
    if the lookup structure does not include the corresponding simulation result, executing the function call.

12. The method of claim 11, wherein determining if the lookup structure includes the corresponding simulation result for the function call comprises providing to the lookup structure a query comprising the function identifier and the function input for the function call.

13. The method of claim 12, further comprising, receiving a user input that affects the client simulation, and sending a state representing the client simulation after the user input to the server system.

14. The method of claim 11, further comprising, if the lookup structure includes the corresponding simulation result, providing a function output from the corresponding simulation result to the client simulation.

15. The method of claim 11, wherein the client simulation is configured to be executed at a lower quality than the server simulation on the server system.

16. The method of claim 11, wherein each of the simulation results received from the server system further comprises an object identifier indicating an object acted on by the function.

17. On a computing device, a method for providing data for memoization on a client device, the method comprising:
    receiving an input of state from the client device;
    executing a server simulation of a digital experience based on the input of state, the server simulation configured to run concurrently with, and ahead of, a client simulation of the digital experience being executed on the client device;

generating a plurality of simulation results from the server simulation;

determining, for each of the plurality of simulation results, a likelihood the client simulation will utilize a particular simulation result, the likelihood based on one or more statistics regarding re-simulation of previous simulation results;

selecting one or more simulation results from the plurality of simulation results based on the likelihood the client simulation will utilize the particular simulation result; and sending the one or more simulation results to the client device for providing memoization to the client simulation.

18. The method of claim 17, wherein each of the one or more simulation results comprises a function input, a corresponding function output generated by a function based on the function input, an object identifier indicating an object acted on by the function, and a function identifier.

19. The method of claim 17, wherein selecting the one or more simulation results is further based on one or more of an amount of time used by the server simulation to generate the particular simulation result and an amount of data in a function output of the particular simulation result.

* * * * *